Aug. 6, 1940.        B. W. JONES ET AL        2,210,412
MOTOR CONTROL SYSTEM
Filed May 18, 1938

Inventors:
Benjamin W. Jones,
Arthur H. Lauder,
by Harry E. Dunham
Their Attorney.

Patented Aug. 6, 1940

2,210,412

UNITED STATES PATENT OFFICE 2,210,412

MOTOR CONTROL SYSTEM

Benjamin W. Jones and Arthur H. Lauder, Schenectady, N. Y., assignors to General Electric Company, a corporation of New York Application May 18, 1938, Serial No. 208,589

13 Claims. (Cl. 172—289)

Our invention relates to motor control systems and particularly to systems for controlling the application of excitation to a synchronous machine so as to pull it into synchronism and for controlling the removal of excitation when the synchronous machine falls out of synchronism.

In the copending application of A. H. Lauder, Serial No. 190,260, filed Feb. 12, 1938, and assigned to the assignee of this application, there is disclosed and claimed an improved arrangement of apparatus for applying and removing the excitation of a synchronous machine, which improvement employs a collector ring and a co-operating rubbing contact, one of which is driven by the motor. One object of our invention is to provide an improvement of the arrangement disclosed and claimed in the aforesaid Lauder application which does not require the use of such a collector ring and associated rubbing contact.

In accordance with our invention, we provide an electromagnetic device in a control circuit which is energized by one phase of the alternating current supply circuit connected to the motor armature winding, means driven by the motor for periodically varying the reluctance of the electromagnetic device, and means controlled by the variations in the reluctance of the electro-magnetic device for effecting the desired switching operations of the motor field circuit.

Figure 1:
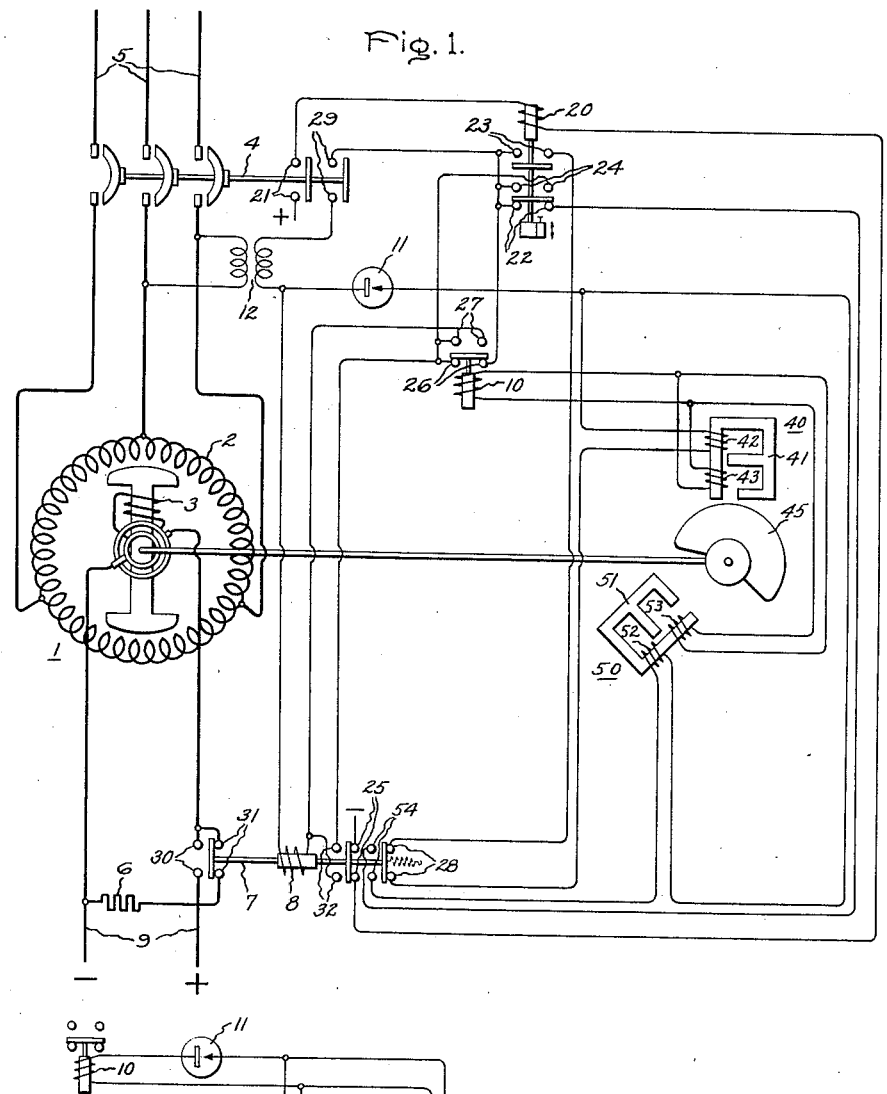
Figure 2:
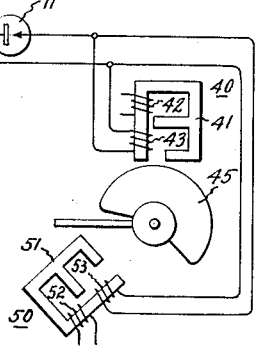

Our invention will be better understood from the following description when taken in connection with the accompanying drawing, Fig. 1 of which diagrammatically illustrates a synchronous motor control system embodying our invention, and Fig. 2 of which is a modification of a portion of the system shown in Fig. 1, and its scope will be pointed out in the appended claims.

Referring to Fig. 1 of the drawing, I represents a synchronous motor which is provided with a polyphase armature winding 2 and a field winding 3. In order to simplify the disclosure, we have shown our invention in connection with a full voltage starting arrangement for the synchronous motor so that it is started by connecting the armature winding 2, by means of a suitable manually controlled switch 4, directly across a polyphase supply circuit 5 while the field winding 3 is short-circuited through a discharge resistor 6. Therefore, normal supply circuit voltage is applied to the motor armature winding 2 to start the motor from rest and accelerate it as an induction motor. In practice, the motor will also have a squirrel-cage winding which is not shown. While we have shown a full voltage starting arrangement, it will be understood that any other well known synchronous motor starting system may be used to start the motor from rest and accelerate it to approximately synchronous speed. Also, in order to simplify the disclosure, we have illustrated a 2-pole motor, but it will be obvious to those skilled in the art that our invention is applicable to motors having any even number of poles.

In accordance with our invention, we provide an arrangement for controlling the operation of the field switch 7 so that, when the motor is operating near synchronous speed as an induction motor, the closing of the field switch is initiated within a predetermined small range of angular displacement between the revolving armature flux and the motor field poles and so that the field switch 7 is opened to effect the removal of excitation from the field winding 3 immediately after the motor falls out of synchronism. In the particular embodiment of our invention shown in the drawing, we accomplish this result by providing a quick acting relay 10 and a suitable unidirectional current-conducting device such as a half-wave copper oxide rectifier 11 in series relation with an electric circuit which has impressed across it a voltage proportional to one of the phase voltages of the supply circuit 5 and which also has connected therein an electromagnetic device 40, the reluctance of which is varied at predetermined points during each revolution of the rotor.

As shown in the drawing, the electromagnetic device 40 is in the form of a transformer comprising a 3-legged core 41 with two windings 42 and 43 respectively, wound around different portions of the core on opposite sides of the center leg. The winding 42, which acts as the primary winding, is arranged to be connected in series with the half-wave rectifier 11 across the secondary winding of a potential transformer 12, the primary winding of which is connected across one phase of the polyphase supply circuit 5 when the switch 4 is closed and the field switch 7 is open. The other winding 43 which acts as the secondary winding of the transformer 40 is connected across the terminals of the winding of relay 10. The core is designed so that the middle leg thereof has a relatively small air gap whereas the outer leg, on the same side of the center core as that portion of the core around which the winding 43 is wound, has a relatively large air gap in order that, normally, most of the flux produced by the current in the winding 42 goes through the middle leg of the core 41 instead of through that portion of the core around which the winding 43 is wound. Consequently, the voltage which is normally induced in the secondary winding 43, as a result of the current flowing through the primary winding 42, of the transformer 40, is insufficient to cause the relay 10 to operate.

On the shaft of the motor 1 is adjustably mounted a magnetic member 45 which is so located with respect to the core 41 of the electromagnetic device 40 that, during a predetermined portion of each revolution of the motor, the magnetic member 45 completes a low reluctance magnetic shunt around the air gap in that portion of the core 41 around which the winding 43 is wound so that the flux linkages between the windings 42 and 43 are increased. However, in order for the relay 10 to be energized sufficiently to effect the operation thereof during that portion of each revolution of the motor when the flux linkages are increased by the magnetic member 45, it is also necessary for the primary winding 42 to be energized by a complete half cycle of current of line frequency during the time interval that the low reluctance path is being maintained. Preferably the magnetic member 45 is so shaped that, when the motor 1 is operating at the maximum induction motor speed from which it is to be synchronized, the low reluctance path is maintained for a time interval equal to approximately the duration of a half cycle of the supply circuit voltage. Therefore, when the motor is operating at this predetermined maximum induction motor speed, the relay 10 operates only when a predetermined angle exists between the motor field poles and the armature flux. At speeds above this predetermined maximum induction motor speed, the relay 10 does not pick up because the length of time the low reluctance path is maintained by the member 45 during each revolution of the motor is less than the duration of a half cycle of supply circuit voltage. At speeds below this predetermined maximum induction motor speed, the range of angular displacement between the motor field poles and the armature flux during which the relay 10 picks up increases directly with the motor slip. However, this increase in angular range is relatively small in degrees over the normal synchronizing range which is usually from 1% slip to 5% slip.

Any suitable means, examples of which are well known in the art, may be provided for preventing the field switch 7 from being closed until after the motor has been started and has reached a speed from which it can be pulled into synchronism by applying direct current to the field winding 3. For accomplishing this result, we have shown a time relay 20 which is so connected that it prevents the field switch 7 from being closed, after the switch 4 has been closed, until a predetermined time has elapsed which is normally long enough to allow the motor to reach the desired synchronizing speed.

In order to effect the opening of the field switch 7 when the motor 1 falls out of synchronism, the connections of the relay 10 and the rectifier 11 to the secondary winding of the transformer 12 are changed in response to the closing of the field switch 7 so that as long as the field switch remains closed and the motor remains in synchronism, the relay 10 is insufficiently energized to be picked up. The new connections of the relay 10, which are established by the closing of the field switch 7, include another 3-legged electro-magnetic device 50, similar in construction to the electro-magnetic device or transformer 40. The primary winding 52 is arranged to be connected in series with the rectifier 11 across the secondary winding of the transformer 12 by the contacts 54 of the field switch 7 when it is in its closed position. The secondary winding 53 is connected across the terminals of the winding of relay 10. The core 51 is so located with respect to a magnetic member on the motor shaft that, during a predetermined portion of each revolution of the motor, the magnetic member completes a low reluctance magnetic shunt around the relatively large air gap in the portion of the core 51 around which the winding 53 is wound to change the magnetic coupling between the windings 52 and 53. As shown in the drawing, the magnetic member 45 is the magnetic member on the motor shaft which is arranged to complete the low reluctance magnetic shunt around the relatively large air gap in the core 51, but it will be obvious that a separate adjustably mounted magnetic member may be mounted on the motor shaft for varying the reluctance of each electromagnetic device. The operation of the arrangement shown in the drawing is as follows: When it is desired to start the motor 1, the switch 4 is closed so that the voltage of the supply circuit 5 is applied directly to the armature winding 2 to start the motor from rest and accelerate it to approximately synchronous speed as an induction motor. The closing of the contacts 21 on the switch 4 completes through the contacts 25 on the field switch 7 an energizing circuit for the operating coil of the time relay 20. This relay 20, however, does not open its contacts 22 and close its contacts 23 and 24 until sufficient time has elapsed after the closing of the switch 4 to allow the motor 1 to reach its maximum induction motor speed. When the relay 20 operates and closes its contacts 23, a circuit is completed across the secondary winding of the transformer 12. This circuit includes the contacts 29 of the switch 4, contacts 23 of relay 20, contacts 28 of field switch 7, winding 42 of electromagnetic device 40 and rectifier 11. Due to the rectifier 11, only alternate half cycles of supply circuit current flow through this circuit. Consequently the flux produced in the core 41 by these half cycles of current induce sufficient voltage in the winding 43 to operate the relay 10 only when the relative angular positions of the armature flux and the field poles are such that the magnetic member 45 shunts the air gap in the portion of the core 41 around which the winding 43 is located during substantially the whole time that a half cycle of current of line frequency is flowing through the winding 42. Under these conditions, the relay 10 is sufficiently energized to pick up and open its contacts 26 and close its contacts 27. When the relay 10 closes its contacts 27, a circuit is completed for the closing coil 8 of the field switch 7 across the secondary winding of the potential transformer 12 through contacts 24 of the time relay 20 and the contacts 29 of the switch 4. The closing of the contacts 30 of the field switch 7 connects the source of excitation 9 to the field winding 3 to cause the motor to pull into step. The opening of the contacts 31 of the field switch 7 effects the disconnection of the discharge resistor 6 from across the field winding 3. By closing its contacts 32, the field switch 7 completes a shunt circuit around the contacts 27 of the relay 10 so that the field switch 7 remains closed when the relay 10 subsequently opens its contacts 27. By opening its contacts 25, the field switch 7 interrupts the circuit of the time relay 20 which, after being deenergized for a predetermined length of time, opens its contacts 23 and 24 and closes its contacts 22. Before the time relay 20 opens its contacts 23 in the circuit of the winding 42, this circuit is opened by the contacts 28 of the field switch 7 so that the quick acting relay 10 returns to its normally deenergized position before the relay 20 closes its contacts 22. Consequently, another holding circuit for the closing coil 8 of the field switch 7 is completed through the contacts 32 of the field switch 7 and the contacts 26 of relay 10 before the original holding circuit for the closing coil 8 is opened at the contacts 24 of the time relay 20.

By closing its contacts 22 the relay 20, when deenergized, completes across the secondary winding of the transformer 12 another circuit for energizing the relay 10 which is connected across the winding 53 of the electromagnetic device or transformer 50. This circuit includes the contacts 22 of the relay 20, contacts 54 of the field switch 7, winding 52 of the electromagnetic device 50 and the half-wave rectifier 11. The relative positions of the device 50 and the magnetic member 45 on the motor shaft are such that as long as the motor runs at synchronous speed, the air gap in the portion of the core 51 around which the winding 53 is mounted is not shunted by the magnetic member 45 at the proper time to effect the operation of the relay 10. However, when the motor falls out of synchronism so that the motor field poles rotate relatively to the motor armature flux, the angular relation between the armature current and the motor field poles is changed. When a predetermined angular relation exists between them the magnetic member shunts the air gap in the portion of the core 51 around which the winding 53 is located for substantially the whole time interval that a half cycle of current is flowing through the winding 52. Under these conditions, the relay 10 is sufficiently energized to pick up and open its contacts 26 in the above-described holding circuit for the closing coil 8 of the field switch 7. The deenergization of the closing coil 8 effects the opening of the field switch 7 so that the source of excitation 9 is disconnected from the field winding 3 and the discharge resistor 6 is reconnected across the terminals of the field winding 3. By closing its contacts 25 and 28, the field switch 7 re-establishes the starting connections for the control apparatus so that the motor is resynchronized in the manner heretofore described as soon as sufficient time has elapsed to allow the relay 20 to pick up and close its contacts 23 and 24.

While in Fig. 1 we have shown the half wave rectifier 11 in the circuits of the windings 42 and 52 of the transformers 40 and 50 respectively, it is evident that a similar result will be obtained by connecting the half wave rectifier 11 in the circuits of the other two windings 43 and 53 of the transformers 40 and 50 respectively in the manner shown in Fig. 2. In both cases the energization of the relay 10 is dependent upon the flux distribution in the transformers 40 and 50 and the rectifying action of the rectifier 11.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States, is:

1. In combination, a synchronous motor having an armature winding and a field winding, an alternating current supply circuit connected to said armature winding, a source of direct current for said field winding, a transformer having a primary winding connected to said supply circuit and a secondary winding, unidirectional current conducting means connected in series with one of said windings of said transformer, means for varying the ratio of voltage transformation between said primary and secondary windings at predetermined points in the path of movement of the rotor of said motor, and means responsive to the secondary voltage of said transformer for controlling the connection between said source of direct current and said field winding.

2. In combination, a synchronous motor having an armature winding and a field winding, an alternating current supply circuit connected to said armature winding, a source of direct current for said field winding, a transformer having a primary winding connected to said supply circuit and a secondary winding, unidirectional current conducting means connected in the circuit of one of said windings of said transformer, means for varying the ratio of voltage transformation between said primary and secondary windings at predetermined points in the path of movement of the rotor of said motor, and means responsive to the secondary voltage of said transformer for connecting said source of direct current to said field winding.

3. In combination, a synchronous motor having an armature winding and a field winding, an alternating current supply circuit connected to said armature winding, a source of direct current for said field winding, a transformer having a primary winding connected to said supply circuit and a secondary winding, unidirectional current conducting means connected in series with one of said windings of said transformer, means for varying the ratio of voltage transformation between said primary and secondary windings at predetermined points in the path of movement of the rotor of said motor, and means responsive to the secondary voltage of said transformer for disconnecting said source of direct current from said field winding.

4. In combination, a synchronous motor having an armature winding and a field winding, an alternating current supply circuit connected to said armature winding, a source of direct current for said field winding, a transformer having a primary winding connected to said supply circuit and a secondary winding, unidirectional current conducting means connected in series with one of said windings of said transformer, means for varying the magnetic coupling between said windings of said transformer at predetermined points in the path of movement of the rotor of said motor, and means responsive to the secondary voltage of said transformer for controlling the connection between said source of direct current and said field winding.

5. In combination, a synchronous motor having an armature winding and a field winding, an alternating current supply circuit connected to said armature winding, a source of direct current for said field winding, a transformer having a primary winding connected to said supply circuit and a secondary winding, unidirectional current conducting means connected in series with one of said windings of said transformer, means for varying the magnetic coupling between said windings of said transformer at predetermined points in the path of movement of the rotor of said motor, and means responsive to the secondary voltage of said transformer for connecting said source of direct current to said field winding.

6. In combination, a synchronous motor having an armature winding and a field winding, an alternating current supply circuit connected to said armature winding, a source of direct current for said field winding, a transformer having a primary winding connected to said supply circuit and a secondary winding, unidirectional current conducting means connected in series with one of said windings of said transformer, means for varying the magnetic coupling between said windings of said transformer at predetermined points in the path of movement of the rotor of said motor, and means responsive to the secondary voltage of said transformer for disconnecting said source of direct current from said field winding.

7. In combination, a synchronous motor having an armature winding and a field winding, an alternating current supply circuit connected to said armature winding, a source of direct current for said field winding, an electromagnetic device having a winding and a magnetic core, a circuit for said winding of said device, unidirectional current conducting means connected in said winding circuit, means for applying across said winding circuit a voltage which varies with the voltage of said supply circuit, means for varying the reluctance of a predetermined portion of the flux path through said core at predetermined points in the path of movement of the rotor of said motor, and means dependent upon the flux in said device due to the energization of said winding thereof and the reluctance of said predetermined portion of the flux path for controlling the connection between said source of direct current and the field winding.

8. In combination, a synchronous motor having an armature winding and a field winding, an alternating current supply circuit connected to said armature winding, a source of direct current for said field winding, an electromagnetic device having a winding and a magnetic core, a circuit for said winding of said device, unidirectional current conducting means connected in series relation with said winding circuit, means for applying across said winding circuit a voltage which varies with the voltage of said supply circuit, means for varying the reluctance of a predetermined portion of the flux path through said core at predetermined points in the path of movement of the rotor of said motor, and means dependent upon the flux produced in said predetermined portion of the flux path by the current in the winding of said device for controlling the connection between said source of direct current and the field winding.

9. In combination, a synchronous motor having an armature winding and a field winding, an alternating current supply circuit connected to said armature winding, a source of direct current for said field winding, an electromagnetic device having a winding and a magnetic core, a circuit for said winding of said device, unidirectional current conducting means connected in said winding circuit, means for applying across said winding circuit a voltage which varies with the voltage of said supply circuit, means for varying the reluctance of a predetermined portion of the flux path through said core at predetermined points in the path of movement of the rotor of said motor, and means dependent upon the flux in said device due to the energization of said winding thereof and the reluctance of said predetermined portion of the flux path for connecting said source of direct current to said field winding.

10. In combination, a synchronous motor having an armature winding and a field winding, an alternating current supply circuit connected to said armature winding, a source of direct current for said field winding, an electromagnetic device having a winding and a magnetic core, a circuit for said winding of said device, unidirectional current conducting means connected in series relation with said winding circuit, means for applying across said winding circuit a voltage which varies with the voltage of said supply circuit, means for varying the reluctance of a predetermined portion of the flux path through said core at predetermined points in the path of movement of the rotor of said motor, and means dependent upon the flux in said device due to the energization of said winding thereof and the reluctance of said predetermined portion of the flux path for disconnecting said source of direct current from said field winding.

11. In combination, a synchronous motor having an armature winding and a field winding, an alternating current supply circuit connected to said armature winding, a source of direct current for said field winding, a transformer having a three-legged core, a primary winding around a portion of the core on one side of the center leg thereof and connected to said supply circuit, a secondary winding around a portion of the core on the other side of the center leg thereof, a half wave rectifier connected in series with said primary winding, means for varying at predetermined points in the path of movement of the rotor of said motor the reluctance of the magnetic path through the portion of the core around which said secondary winding is wound, and means responsive to the secondary voltage of said transformer for controlling the connection between said source of direct current and said field winding.

12. In combination, a synchronous motor having an armature winding and a field winding, an alternating current supply circuit connected to said armature winding, a source of direct current for said field winding, a transformer having a three-legged core, a primary winding around a portion of the core on one side of the center leg thereof and connected to said supply circuit, a secondary winding around a portion of the core on the other side of the center leg thereof, a half wave rectifier connected in series with said primary winding, means for varying at predetermined points in the path of movement of the rotor of said motor the reluctance of the magnetic path through the portion of the core around which said secondary winding is wound, and means responsive to the secondary voltage of said transformer for connecting said source of direct current to said field winding.

13. In combination, a synchronous motor having an armature winding and a field winding, an alternating current supply circuit connected to said armature winding, a source of direct current for said field winding, a transformer having a three-legged core, a primary winding around a portion of the core on one side of the center leg thereof and connected to said supply circuit, a secondary winding around a portion of the core on the opposite side of the center leg thereof, a half wave rectifier connected in series with said primary winding, means for varying at predetermined points in the path of movement of the rotor of said motor the reluctance of the magnetic path through the portion of the core around which said secondary winding is wound, and means responsive to the secondary voltage of said transformer for disconnecting said source of direct current from said field winding.

BENJAMIN W. JONES.
ARTHUR H. LAUDER.